Aug. 4, 1964     F. V. PURSE     3,143,293
VARIABLE-AREA NOZZLE
Filed April 13, 1961     3 Sheets-Sheet 1
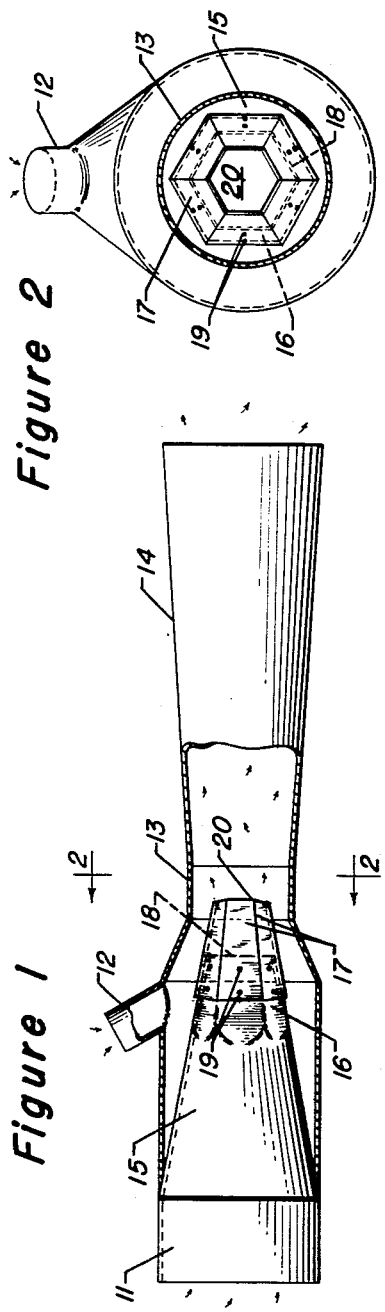
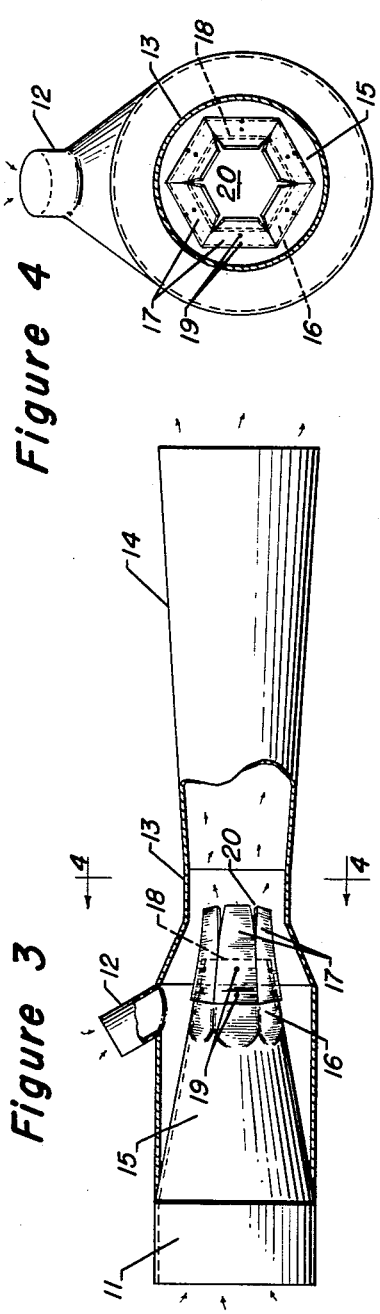
INVENTOR:
Frank V. Purse
BY: Chester J. Giuliani
Philip T. Liggett
ATTORNEYS Aug. 4, 1964  F. V. PURSE  3,143,293
VARIABLE-AREA NOZZLE
Filed April 13, 1961  3 Sheets-Sheet 2

INVENTOR:
Frank V. Purse

BY: *Chester J. Giuliani*
*Philip T. Liggett*
ATTORNEYS

Aug. 4, 1964  F. V. PURSE  3,143,293
VARIABLE-AREA NOZZLE

Filed April 13, 1961  3 Sheets-Sheet 3

INVENTOR:
Frank V. Purse

BY:
Chester J. Giuliani
Philip T. Liggett
ATTORNEYS

United States Patent Office 3,143,293
Patented Aug. 4, 1964

3,143,293
VARIABLE-AREA NOZZLE
Frank V. Purse, Skokie, Ill., assignor to Universal Oil Products Company, Des Plaines, Ill., a corporation of Delaware
Filed Apr. 13, 1961, Ser. No. 102,677
6 Claims. (Cl. 239—75)

This invention relates to apparatus for the commingling of two or more fluid streams and more particularly it concerns a jet pump of special design in which the flow ratio of injected fluid to motive fluid may be automatically varied in inverse relationship to the flow rate of motive fluid. Specifically, the instant invention relates to apparatus for injecting secondary or combustion air into a flowing stream of combustible waste gases, for example, waste gases comprising the exhaust gases of internal combustion engines such as the spark ignition gasoline engine, diesel engine, butane engine, and the like.

The removal of certain components from vehicular exhaust gases is deemed to be of importance at the present time. The unavoidably incomplete combustion of hydrocarbon fuels by the gasoline or diesel engine results in the generation of substantial amounts of unburned hydrocarbons and other undesirable waste gases which are discharged to the atmosphere through the exhaust line. With the ever-increasing concentration of automobiles, particularly in urban areas, the resultant discharge of these undesirable products into the atmosphere may reach high proportions. These combustion products are known to react with atmospheric oxygen under the influence of sunlight to produce smog. Such waste gases include, for example, saturated and unsaturated hydrocarbons, carbon monoxide, aromatics, partially oxidized hydrocarbons such as alcohols, ketones, aldehydes, acids, and oxides of nitrogen and sulfur. Methods for converting vehicular exhaust gases to harmless materials, such as, for example, carbon dioxide and water, may be classified into two broad areas: (1) catalytic conversion and, (2) non-catalytic or thermal conversion. In the catalytic method, the exhaust gases leaving the engine are passed, with or without heating or cooling, into contact with a suitable conversion catalyst and the conversion products of the resulting reactions are thence discharged into the atmosphere. In general, the preferred conversion reactions involve more or less complete oxidation of combustibles, and to this end it is necessary to provide sufficient oxygen, obtained from air or other oxygen-containing gas, in the exhaust gases prior to contact with the catalyst. In the thermal method, the exhaust gases are simply heated to, or maintained at, a sufficiently high temperature, in the presence of oxygen, so as to burn without utilization of a catalyst. With either method it is necessary to provide at least a stoichiometric amount, and preferably an excess amount, of oxygen or air in the exhaust gases. It is not feasible to manipulate the carburetor in order to provide such excess air since this would seriously reduce the efficiency and/or power of the engine, and, therefore, it is usually desirable to separately add the required amount of air to the exhaust gases at a point between the exhaust valve ports of the engine and the catalytic or thermal conversion zone located downstream therefrom. Such excess air is also termed "secondary air," as opposed to the primary air injected by the carburetor and employed to support combustion of the fuel within the engine cylinders proper.

A preferred means of adding secondary air is with a jet pump or injector serially connected in, or forming a part of, the exhaust gas conduit and disposed upstream from the conversion zone. Jet pumps are well known in the art of fluid transport and only a brief description of the principal elements thereof is necessary here. In essence, a jet pump consists of an inlet nozzle arranged to discharge into a venturi-shape diffuser section. The diffuser generally comprises an inlet throat section having a cross-sectional area smaller than the jet pump outlet and a gradually expanding outlet section to increase the cross-sectional area up to that of the jet pump outlet. A conduit or other port means for conducting the aspirated or injected fluid connects with the interior of the diffuser at a point downstream from but adjacent to the nozzle opening. A stream of motive fluid is passed through the nozzle and is thereby formed into a high velocity jet which passes into the diffuser and creates a region of low pressure at the upstream end thereof, into which the injected fluid is entrained or aspirated. The diffuser functions to mix the motive fluid and the injected fluid and to convert the residual velocity of the mixture into pressure. A jet pump is known variously, and somewhat arbitrarily, as an injector, ejector, exhauster, eductor, aspirator, etc., depending upon the physical state of motive fluid and injected fluid employed, i.e., whether liquid, gas, or condensable vapor, as well as upon the primary function of the jet pump, i.e., whether used to exhaust, to compress, or to mix. Structurally, however, they are all essentially identical. For the sake of convenience, the term "injector" will be used herein in a generic sense as designating a device for injecting one fluid into another by utilizing a high velocity jet of the latter in the manner aforesaid.

When an injector is employed to inject air into an exhaust gas stream, the exhaust gas itself serves as the motive fluid, the secondary air being the injected fluid; when injector means is applied to the exhaust gas stream of an internal combustion engine, especially a spark ignition engine operated under widely varying conditions of speed and load as in the case of a motor vehicle, peculiar difficulties are thereby encountered. The ordinary operation of a motor vehicle is customarily divided into four modes, namely, the modes of idle, acceleration, cruise and deceleration. At idle and deceleration, most spark ignition engines operate with a richer fuel:air ratio than during the open throttle operation of acceleration and cruise, and the concentration of combustibles in the exhaust gases is very much higher than during cruise and acceleration. The secondary air requirements for satisfactory conversion of the exhaust gas are hence larger, relative to exhaust gas flow, at such rich mixture, low engine speed operation; in other words, the mass ratio of secondary air aspirated to exhaust gas must be greater at low engine speed, and consequently at low exhaust gas flow, than at high engine speed, corresponding to high exhaust gas flow. If the injector is designated to inject the large amount of secondary air required at idle and at deceleration, the nozzle size must be made relatively small, and consequently, at cruise or acceleration, the back pressure on the spark ignition engine becomes inordinately high and causes poor engine performance as well as rapid burning out of the exhaust valves; on the other hand, if the injector is designed within the limits of back pressure at maximum gas flow whereby the nozzle size is made somewhat larger, insufficient air is injected at idle and deceleration. Thus, an injector having a nozzle whose orifice is of fixed cross-section cannot be successfully utilized in such applications.

The present invention provides a ready solution to this problem through the utilization of a variable area nozzle, that is, a nozzle the outlet cross-sectional area of which varies in inverse relation to the velocity of exhaust gas passing therethrough. This is accomplished by providing a nozzle with at least one lateral wall portion which is constructed in the form of a resilient or spring-like cantilever deflection member and is therefore capable of being deflected outwardly from the longitudinal axis of the nozzle whereby the outlet cross-sectional area of the nozzle is greater than when the deflection member is in its undeflected position.

In one embodiment, the degree of nozzle opening is flow-responsive, that is, the deflectable lateral wall portion is forced outwardly by the direct impact of the exhaust gases thereon, the impact of the gases subjecting the deflection member to a bending moment.

In another embodiment, the deflectable lateral wall portion is constructed in the form of a bimetallic temperature-responsive bending member the relative position of which is a function of the temperature of exhaust gases flowing through the nozzle. The temperature of the exhaust gases varies over a wide range depending on the operational mode of the engine, typically 300° F. to 1200° F. in the case of an automobile; furthermore, it is a characteristic of internal combustion engines generally that the exhaust gas temperature is approximately correlative with the exhaust gas flow rate which in turn varies with the operational mode of the engine; at the high flow conditions of cruise and acceleration, the exhaust gas temperature is also in the high range, while at the low flow conditions of idle and deceleration, the exhaust gas temperature is substantially lower. Thus, in this second embodiment, the degree of nozzle opening is made a direct function of exhaust gas temperature and therefore an indirect function of exhaust gas flow rate.

Regardless of the means used to effect change of nozzle area, the operation of the invention herein is as follows: when the nozzle opening is increased, the back pressure in the engine exhaust manifold is lowered; when the nozzle opening is reduced, the velocity of the exhaust gas jet is increased and more air is injected relative to the absolute exhaust gas flow. Consequently, at the low exhaust gas flow rates obtaining during idle and deceleration, the nozzle opening is reduced and sufficient air is injected; at these conditions the back pressure on the engine is not excessive because only a small total flow passes through the restricted nozzle. On the other hand, at the high exhaust gas flow rates obtaining during cruise and acceleration, the nozzle is opened up to provide increased nozzle opening, and only reasonable back pressures are imposed on the engine; with the nozzle opening thus increased, the mass ratio of secondary air injected to exhaust gas is reduced, but the concentration of air required is also less since the concentration of combustibles in the exhaust gases to be converted is lower than at the modes of idle or deceleration.

It is, therefore, a general embodiment of this invention to provide a nozzle comprising a hollow open-ended frustum, means constraining from motion the base portion of said frustum, and at least one resilient cantilevered wall section free to deflect outwardly from the longitudinal axis of said frustum and independently of the other wall portions of said frustum.

A more specific embodiment of the present invention relates to a nozzle comprising a hollow open-ended pyramidal frustum having relatively thin lateral walls, means constraining from relative motion the respective major base portions of said lateral walls, and each of said lateral walls forming a resilient cantilever deflection member free to deflect outwardly from the longitudinal axis of said frustum and independently of the other lateral walls.

Another specific embodiment of this invention is directed to a nozzle comprising a hollow open-ended pyramidal frustum having relatively thin lateral walls which are continuously detached from each other over at least a portion of their longitudinal edges including the narrow ends of said lateral walls, means constraining from relative motion the respective base portions of said lateral walls, and each of said lateral walls comprising an inner layer and an outer layer of different metals connected together to form a bimetallic temperature-responsive cantilever deflection member free to deflect outwardly from the longitudinal axis of said frustum and independently of the other lateral walls.

A more particular embodiment of the present invention provides a nozzle comprising a hollow frusto-conical member terminating in an opening of reduced cross-section, the interior surface of said frusto-conical member which is adjacent to said opening being formed into a regular pyramidal frustum of $n$ flat surfaces where $n$ is an integer greater than 2, a hollow open-ended regular pyramidal frustum insert member of $n$ sides defined by relatively thin lateral walls and having a taper angle substantially equal to that of said first-mentioned frustum, the open major base of said insert member having a greater perimeter than said opening and the open minor base of said insert member having a smaller perimeter than said opening and at least two adjacent longitudinal edges of said insert member being continuously slit over at least a portion of their length including the minor base portion of the lateral wall defined by said edges, said insert member being fitted within said frusto-conical member and protruding through the opening thereof so that the major base portion of each lateral wall of the insert member is in uniform and co-extensive contact with a corresponding flat surface of the frusto-conical member, the lateral wall of said insert member which is defined by said slit edges forming a resilient cantilever deflection member free to deflect outwardly from the longitudinal axis of said insert member and independently of the other lateral walls.

The structure of the invention together with its several embodiments, as well as the operation thereof, may best be described in conjunction with the accompanying drawings which are presented as illustrative of the best mode of practicing the invention, but not by way of limitation upon its generally broad scope.

FIGURE 1 is a sectional elevation view of an injector or aspirator having a variable area nozzle which is shown in its closed position; FIGURE 2 is a sectional end view of the apparatus of FIGURE 1.

FIGURE 3 shows the injector of FIGURE 1 wherein the nozzle is in an open position, and FIGURE 4 is an end view of the apparatus of FIGURE 3.

Figure 6:
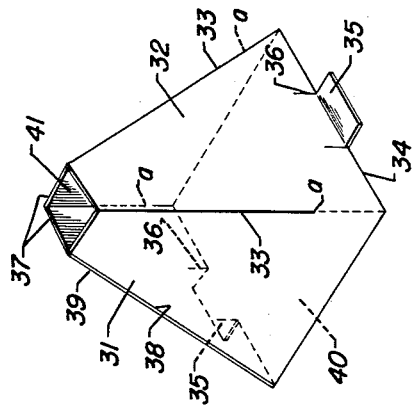
FIGURES 5, 6 and 7 illustrate a preferred construction and method of assembly of the variable area nozzle.

Referring first to FIGURES 1 and 2, there is shown in FIGURE 1 a partial sectional elevation view of an injector or aspirator, and FIGURE 2 is an enlarged cross-sectional view thereof taken along line 2—2 of FIGURE 1. The injector comprises a motive fluid inlet conduit 11, an injected fluid inlet conduit 12, and a divergent nozzle or diffuser 14 having a constricted throat section 13 at the upstream end thereof. A convergent frusto-conical nozzle 15 is connected, as by welding, to the interior surface of inlet conduit 11. Nozzle 15 terminates in an opening 18 of reduced cross-section. The exterior surface of the downstream end portion of nozzle 15 is machined into a plurality of flat surfaces 16, in this case, six identical trapezoidal surfaces, forming a regular hexagonal pyramidal frustum. Six thin, flat spring metal vanes 17, having the form of identical trapezoids whose taper angle is equal to the taper angle of surfaces 16, are aligned with and fastened to corresponding surfaces 16 by rivets 19. Vanes 17 project to the right beyond opening 18, their longitudinal edges lying in abutting contact, to form an extension of nozzle 15 having the shape of a hollow open-ended hexagonal pyramidal frustum and terminating in a hexagonal opening 20 whose cross-sectional area is less than that of opening 18. The major base portions of vanes 17, that is, the end portions thereof having the greater width, are thus constrained from relative motion by reason of their connection to surfaces 16 of nozzle 15, while the minor base portions of vanes 17, that is, the end portions thereof having the lesser width, are free ends which are free to deflect outwardly in response to increased internal pressure. In FIGURES 1 and 2, vanes 17 are shown in their closed position.

FIGURE 3 is a partial sectional elevation view of the injector of FIGURE 1 wherein vanes 17 have assumed a more open position, and FIGURE 4 is an enlarged cross-sectional end view thereof taken along line 4—4 of FIGURE 3; the elements of FIGURES 3 and 4 which correspond to those of FIGURES 1 and 2 have identical numbers. Vanes 17 have been bent outwardly, whereby opening 20 is increased an area, approaching that of fixed opening 18.

In connection with the specific application of this invention to the aspiration of secondary air into engine exhaust gases, the operation thereof is as follows: exhaust gases from the engine exhaust manifold pass through inlet conduit 11, flow through nozzle 15 and discharge as a high velocity jet from opening 20; this jet action creates a sub-atmospheric pressure zone in throat 13 so that air from the surrounding atmosphere is drawn through conduit 12 into throat 13 and subsequently into diffuser 14 along with the exhaust gases where the two streams are mixed and at least some pressure energy is recovered; the downstream portion of diffuser 14, communicates with a suitable reactor or conversion chamber (not shown) wherein oxidation of the exhaust gases is effected. At low exhaust gas flow, vanes 17 are closed, as in FIGURES 1 and 2, and opening 20 has a minimum cross-section which is sized to provide an optimum secondary air injection rate for that particular exhaust gas flow rate. As the exhaust gas flow increases, the increased impact of the exhaust gases acting on the interior inclined surfaces of vanes 17 exerts a bending moment thereon causing vanes 17 to deflect outwardly from the longitudinal axis of nozzle 15, as in FIGURES 3 and 4, causing opening 20 to increase in size; this reduces the jet velocity of the exhaust gases issuing from opening 20 so that less air is aspirated than would be the case if opening 20 were of fixed cross-sectional area, and also lessens the pressure of the exhaust gases upstream from opening 20 to and including the engine exhaust manifold. Vanes 17 are elastic or resilient cantilever deflection members, so that upon decrease in the internal pressure, the vanes will automatically return to a more intermediate or to a closed position. Through appropriate design of the system parameters, that is, the diameters of openings 18 and 20, the length of vanes 17, the deflection constant of vanes 17, the throat diameter, the relative position of nozzle 15 to throat 13, the size and number of conduits 12 if more than one is provided, and other like considerations, the injector may be caused to have any desired air injection characteristic ranging from one of positive slope to negative slope and which may be linear or nonlinear. For example, the injector may be so designed that the mass ratio of secondary air aspirated to exhaust gas passing through the injector varies in inverse relationship to the mass flow rate of exhaust gas. Such a characteristic is highly desirable for vehicular applications for the reasons hereinabove pointed out.

It is essential that vanes 17 be flat or at least free of any substantial transverse curvature, otherwise their stiffness to longitudinal bending would be increased manyfold and they would not readily function as resilient deflection members. Vanes 17 may be constructed of any suitable material which possesses the necessary degree of elasticity at the normal exhaust gas temperatures; suitable materials of construction therefor include tempered spring steels such as manganese steels (AISI C1074, C1075) chromium steels (AISI 5150), nickel-chromium-molybdenum steels (AISI 8650), etc.; another good material of construction is Inconel X (78.5% Ni, 14% Cr, 6.5% Fe, 0.25% Mn, 0.25% Si, 0.2% Cu, 0.08% C). Another embodiment of the invention wherein vanes 17 are constructed as bimetallic temperature-responsive bending members will be discussed hereinbelow.

Figure 8:
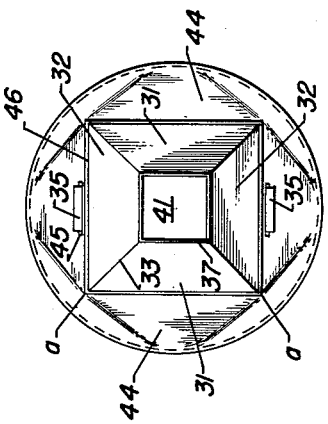
FIGURE 8 is an end view of the complete assembly of FIGURE 7.
Figure 5:
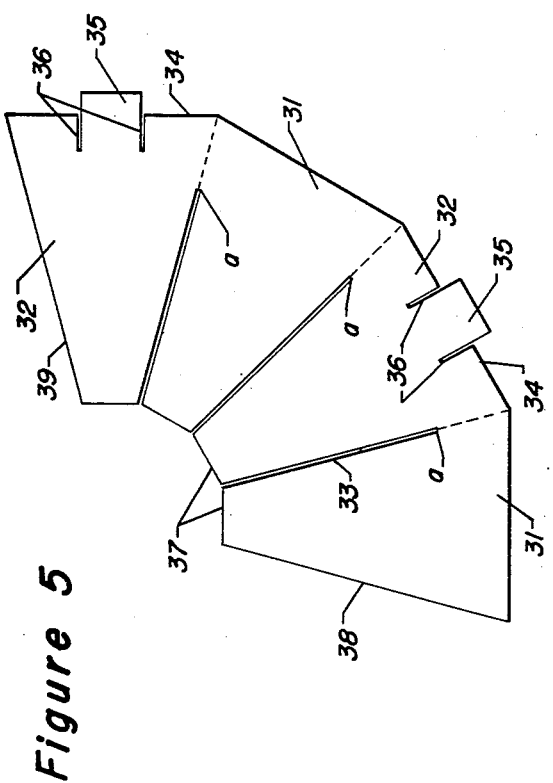
Figure 7:
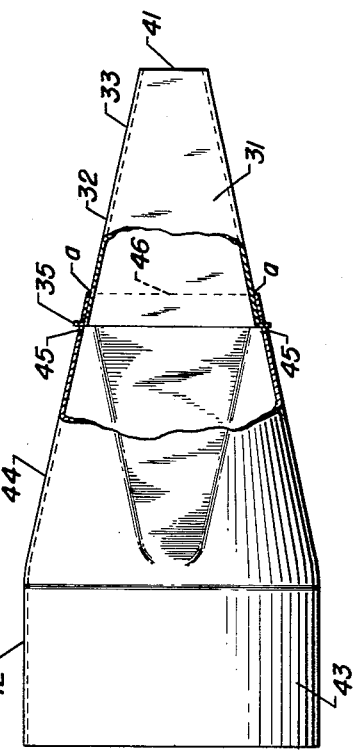

FIGURES 5, 6, 7 and 8 illustrate a preferred construction and method of assembly of the variable area nozzle. In FIGURE 5, there is shown a template of thin spring metal which, prior to heat treatment, is formed into four trapezoidal sections 31 and 32. Narrow slots or slits 33 are cut in the template between adjacent sections 31 and 32 and extend from the minor bases 37 (narrow ends) of the trapezoidal sections to points $a$. Tab members 35 project from the major bases 34 (wide ends) of trapezoidal sections 32 and short slits 36 are cut into sections 32 on each side of tabs 35. The template is then folded into a regular tetragonal pyramidal frustum, as in FIGURE 6. The frustum has an open major base 40 and an open minor base 41. Slits 33 lie on three longitudinal edges of the frustum, while the fourth longitudinal edge, consisting of free edge 38 of trapezoidal wall 31 and free edge 39 of trapezoidal wall 32, is thus slit over its entire length. Tabs 35 are bent obliquely to trapezoidal walls 32. After the pyramidal frustum has been thus formed, it is heat-treated to impart the desired spring characteristics thereto. The frustum is designated hereinafter as an "insert member" for use in the apparatus of FIGURES 7 and 8. Turning next to FIGURE 7, there is shown a frusto-conical nozzle 43 comprising a circular inlet section 42 and a tapered outlet section 44 terminating in an orifice 46 of reduced cross-section. The interior surface of section 44, or at least that portion thereof which is contiguous to orifice 46, is machined, cast or otherwise formed into a regular tetragonal pyramidal frustum having a taper angle substantially equal to that of the insert member of FIGURE 6. A pair of slots 45 are cut into section 44 at opposite sides thereof as shown in FIGURE 7. The insert member is then inserted into nozzle 43 from left to right, the lateral walls 31 and 32 of the former being held parallel with corresponding flat surfaces of section 44. As the insert member is urged from left to right, tabs 35 are free to depress inwardly by virtue of slits 36; however, when the tabs 35 come into alignment with slots 35, they will spring outwardly into locking engagement with slots 45 thereby securing the insert member to frusto-conical member 43. The major base portions of walls 31 and 32 are thus urged into uniform and co-extensive contact with the corresponding flat surfaces of section 44, thereby securely restraining said major base portions from relative motion while at the same time providing minimum disruption or constriction of the flow path through the apparatus and avoiding extraneous paths of fluid leakage between walls 31, 32 and outlet section 44. Points $a$, the leftmost termini of slits 33, are preferably located at least as far back as the perimeter of orifice 46, so that the remaining lengths of walls 31 and 32 (from points $a$ to open minor base 41) will be free to function as cantilevered deflection members. FIGURE 8 is an enlarged end view of the assembly of FIGURE 7, illustrating walls 31 and 32 in their closed position. The utilization and operation of this embodiment of the invention is the same as that discussed in connection with the apparatus of FIGURES 1 to 4, inclusive.

Figure 10:
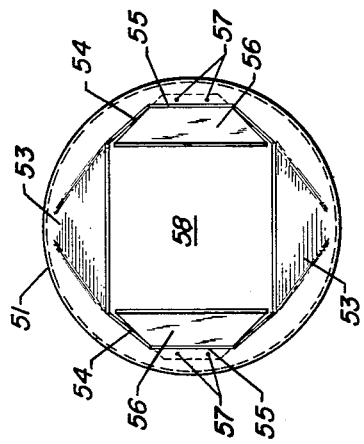
FIGURES 10 and 11 are end views of FIGURE 9 illustrating the nozzle in its closed and open positions respectively.
Figure 9:
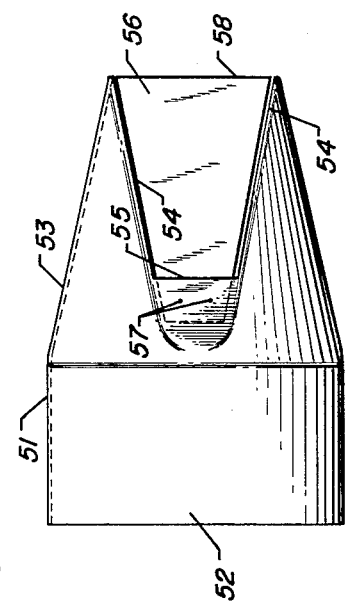
FIGURE 9 is an elevation view of another form of a variable area nozzle.
Figure 11:
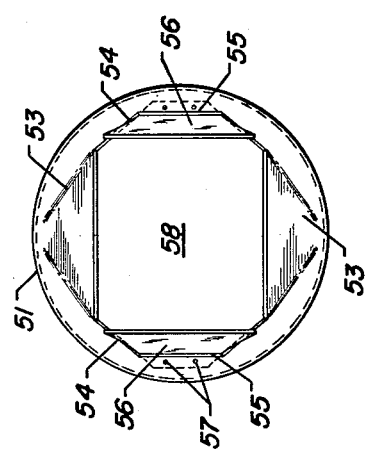

Referring next to FIGURES 9, 10 and 11, FIGURE 9 illustrates another embodiment of the invention wherein only two opposite walls of the nozzle form resilient cantilevered deflection members, the remaining wall portions thereof being rigid. FIGURES 10 and 11 are end views of FIGURE 9 showing the nozzle in its open and closed positions respectively. The nozzle comprises a rigid frusto-conical member 52 having a cylindrical inlet section 51 and a pyramidal frustum outlet section 53 terminating in orifice 58. A pair of opposite lateral walls of outlet section 53 are cut away from orifice 58 back to lines 55, and the portions so removed are replaced with thin deflectable trapezoidal vanes 56, the minor base portions of which (narrow ends) are connected to wall 53 on the interior side thereof by means of rivets 57. Longitudinal edges 54 of vanes 56 abut against the upper and lower rigid walls of outlet section 53 when the vanes are closed but are maintained in sliding contact therewith so that the vanes are free to deflect outwardly unhindered by frictional interaction between edges 54 and section 53. It will be apparent that only one lateral wall of the nozzle may be made deflectable, if desired, or three or even all four lateral walls may be formed into cantilever deflection members, depending upon the desired relationship between cross-sectional area of orifice 58 and the deflection of lateral walls 56.

Figure 12:
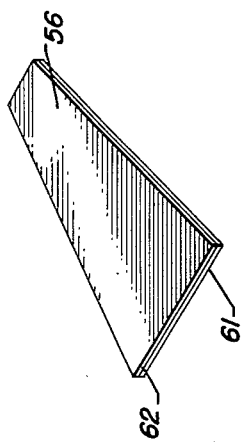
FIGURE 12 depicts a particular construction of a cantilevered wall section comprising a bimetallic strip which may be used in lieu of spring metal walls in all embodiments of the invention.

The foregoing embodiments of the invention have been considered primarily in the light of the proposition that the deflectable lateral walls of the pyramidal frustum are spring members the amount of deflection of which is caused and determined by the impact pressure of motive fluid passing therethrough. It has previously been pointed out, however, that an alternative embodiment of the invention provides that the deflection of the lateral walls may be caused by temperature changes in the temperature of the motive fluid, in which case the cantilevered lateral walls are constructed not as spring members, but as bimetallic temperature-responsive bending members. FIGURE 12 illustrates such a construction for a typical lateral wall, as for example, for vane 56 of FIGURE 9. In FIGURE 12, vane 56 comprises dual layers 61 and 62 of different metals suitably bonded together, as by welding or brazing. The metals selected have different coefficients of thermal expansion, a common combination being Invar-brass, Invar-stainless steel, etc. For the particular application for which the present invention is designed, it is necessary that vanes 56 deflect outwardly from the longitudinal axis of the nozzle as the motive fluid temperature increases so that the area of orifice 58 (FIGURES 10, 11) varies in direct relationship to such temperature. Accordingly, the inner layer 61 of vane 56 is made the high-expansion metal, for example iron, and outer layer 62 is made the low-expansion metal, for example Invar. The lateral walls of bimetallic construction may be employed in any of the above-described specific embodiments as substitutes for the spring metal walls; for example, vanes 17 of FIGURE 1, trapezoidal walls 31, 32 of FIGURES 5-8 inclusive, or vanes 56 of FIGURE 9, may comprise bimetallic temperature-responsive elements. The mode of operation of this embodiment of the invention may best be described with reference again to FIGURES 1-4, considering now that vanes 17 are formed of inner and outer layers of different metals, the inner layer having a higher co-efficient of thermal expansion than the outer layer. The temperature of the exhaust gases entering conduit 11 varies over a rather wide range, being higher at the high exhaust gas flow conditions of cruise and acceleration and lower at the low exhaust gas flow conditions of idle and deceleration. The exhaust gases pass in heat exchange contact with the interior surfaces of vanes 17, which causes their temperature to approach that of the exhaust gases. By virtue of unequal expansion stresses induced in vane 17, the vanes deflect outwardly, the magnitude of deflection increasing as the temperature increases, and conversely; and the area of opening 20 is thus varied as a direct function of the exhaust gas temperature. As the area of opening 20 increases, the jet velocity of the exhaust gases is reduced. Consequently, the ratio of air injected to total exhaust gas passing through the nozzle is attenuated with increasing exhaust gas flow, and the back pressure imposed on the engine exhaust valves is likewise reduced, in the same manner as is the case when the vanes are deflected directly by impact effects.

Another variant of the invention using the principal of deflection by unequal thermal stresses may be obtained by constructing the cantilevered deflection member as a triple layer sandwich, the inner and outer layers being metals which may be the same or different metals, and the central layer being a thin sheet of flexible heat insulating material such as Teflon or fiberglass. Referring again to FIGURE 1 and considering that vanes 17 now embody said triple-layered construction, it should be noted that secondary air inlet conduit 12 is positioned adjacent and, preferably, slightly to the left of vanes 17 so that the indrawn stream of air contacts the exterior surfaces of vanes 17 as it flows into throat 13. This stream of air is cool and of relatively constant temperature, being obtained from the surrounding atmosphere. By direct heat exchange between the incoming air and vanes 17, the exterior surfaces of the latter are maintained at a fairly constant temperature. (If desired, one may employ a plurality of circumferentially spaced conduits 12 or an annular slot to provide a more uniform air flow distribution about vanes 17.) Since the outer layer of vanes 17 is thus maintained relatively cool, while the inner layer of vane 17 is maintained hot and approximates the temperature of the exhaust gases passing through the nozzle, the vanes will deflect outwardly from the longitudinal axis of a nozzle in direct relationship to the temperature of the exhaust gases.

Numerous modifications of the basic invention described herein will be apparent to those skilled in the art. For example, while the pyramidal frustum is preferably regular from the standpoint of ease of fabrication, it may instead be an irregular pyramidal frustum or even partially conical and partially flat so long as the deflection members themselves are flat. The pyramidal frustum may have any number of sides, that is, three, four, five, six, seven, eight, nine, ten or more. Although a ten-sided pyramidal frustum has an opening more closely approximating a circular orifice, it has been found that a substantially square opening, as produced by a tetragonal pyramidal frustum, gives equally good results, and is of course less expensive to manufacture.

While the present invention is especially adapted to injecting secondary air into the exhaust gas of an internal combustion engine, and finds its greatest utility in circumventing the aforesaid peculiar problems associated with such application, it is not intended that the use of the instant apparatus be so limited. Generally speaking, the invention may be employed in any process involving the continuous commingling of two or more fluids, either being a liquid or gas, wherein the mass ratio of one fluid to the other is to be varied or controlled in accordance with either the flow rate or the temperature of one of the streams. Exemplary applications include the catalytic oxidation of industrial furnace or regenerator flue gases, particularly where such gases vary in quality and/or combustibles content, the catalytic conversion of noxious off-gases resulting from chemical processes such as the oxidation of naphthalene to phthalic anhydride, the halogenation of hydrocarbons by high velocity controlled mixing of hydrocarbon and halogen under halogenating conditions, and many others.

I claim as my invention:

1. A nozzle comprising a hollow frusto-conical member terminating in an opening of reduced cross-section, the interior surface of said frusto-conical member which is adjacent to said opening being formed into a regular pyramidal frustum of $n$ flat surfaces where $n$ is an integer greater than 2, a hollow open-ended regular pyramidal frustum insert member of $n$ sides defined by relatively thin flat lateral walls whose longitudinal edges lie in abutting contact and having a taper angle substantially equal to that of said first-mentioned frustum, the open major base of said insert member having a greater perimeter than said opening and the open minor base of said insert member having a smaller perimeter than said opening and at least two adjacent longitudinal edges of said insert member being continuously slit over at least a portion of their length including the minor base portion of the lateral wall defined by said edges, said insert member being fitted within said frust-conical member and protruding through the opening thereof so that the major base portion of each lateral wall of the insert member is in uniform and co-extensive contact with a corresponding flat surface of the frusto-conical member, the lateral wall of said insert member which is defined by said slit edges forming a resilient cantiliver deflection member free to deflect outwardly from the longitudinal axis of said insert member and independently of the other lateral walls.

2. The nozzle of claim 1 further characterized in that one longitudinal edge of said insert member is slit over its entire length and $n-1$ longitudinal edges thereof are slit from the open minor base of the insert member to a point adjacent to said opening of said frusto-conical member so that each of said lateral walls forms a cantilever deflection member.

3. The nozzle of claim 2 further characterized in the provision of retaining means for attaching said insert member to said frusto-conical member.

4. The nozzle of claim 3 further characterized in that said retaining means comprises a pair of tabs connected to opposite lateral walls of said insert member at the major base portions thereof, a pair of slots formed in the corresponding flat surfaces of said frusto-conical member, the tabs coming into locking engagement with the slots when said insert member is fitted into said frusto-conical member.

5. The nozzle of claim 1 further characterized in that said lateral walls are constructed of spring steel.

6. The nozzle of claim 1 further characterized in that each of said lateral walls comprises an inner layer and an outer layer of different metals connected together to form a bimetallic temperature-responsive cantilever deflection member free to deflect outwardly from the longitudinal axis of said insert member and independently of the other lateral walls, said inner metal layer having a higher coefficient of thermal explanation than said outer metal layer.

References Cited in the file of this patent

UNITED STATES PATENTS

| | | |
|---|---|---|
| 1,550,255 | Hiles | Aug. 18, 1925 |
| 2,303,992 | Frazer et al. | Dec. 1, 1942 |
| 2,580,149 | Woods | Dec. 25, 1951 |
| 2,595,737 | Von Rotz | May 6, 1952 |
| 2,905,543 | Schreter et al. | Sept. 22, 1959 |
| 2,953,248 | Troland | Sept. 20, 1960 |
| 2,986,002 | Ferri | May 30, 1961 |
| 2,992,084 | Schrapp | July 11, 1961 |

FOREIGN PATENTS

| | | |
|---|---|---|
| 712,068 | Germany | Aug. 6, 1951 |